Jan. 16, 1951    M. J. SCHNEIDER    2,538,386
MIRRORED PICTURE FRAME
Filed May 16, 1947
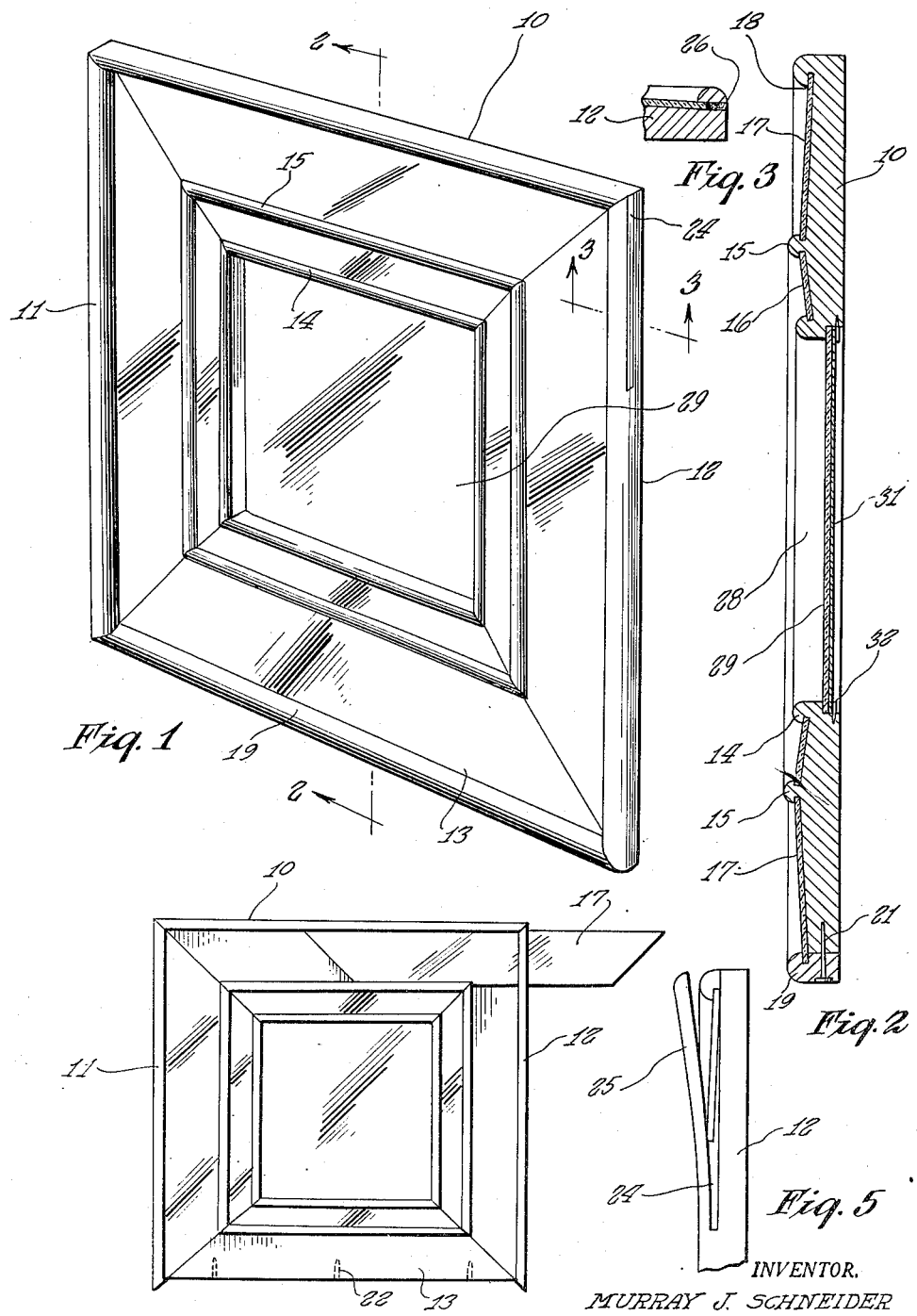
INVENTOR.
MURRAY J. SCHNEIDER
BY
Carl Miller
ATTORNEY

UNITED STATES PATENT OFFICE 2,538,386

MIRRORED PICTURE FRAME

Murray J. Schneider, Bronx, N. Y., assignor of thirty-three and one-third per cent to Louis Weiss, Bronx, and thirty-three and one-third per cent to Milton Liss, Arverne, N. Y.

Application May 16, 1947, Serial No. 748,463

3 Claims. (Cl. 40—152)

This invention relates to picture frames.

It is an object of the present invention to provide a picture frame with channel elements so arranged that mirror pieces inlaid in the frame pieces may be retained therein without the need for a gluing of the mirror pieces to the frame pieces whereby the silver backing on the mirror pieces would be destroyed.

Other objects of the present invention are to provide a picture frame having mirror pieces on the front of the frame which is of simple construction, easy to assemble and easy to have the mirror pieces assembled to it, inexpensive to manufacture, and of compact and neat design.

For other objects and for a better understanding of the invention, reference may be had to the following detailed description taken in connection with the accompanying drawing, in which Fig. 1 is a perspective view looking upon the front of the picture frame and upon one end thereof.

Fig. 2 is a cross-sectional view, in elevation, taken on line 2—2 of Fig. 1.

Fig. 3 is a detail cross-sectional view showing the slotted side frame piece through which a mirror piece is inserted.

Fig. 4 is a front elevational view of the mirror partly assembled.

Fig. 5 is a fragmentary side elevational view looking upon the ends of the frame piece having the slot with the slot side part extended so that the mirror piece can be extended through it and located on the top frame piece.

Referring now to the figures, 10, 11, 12 and 13 represent side frame pieces. The side frame piece 10 has a channel bead 14 and a channel bead 15 adapted to receive a small piece of mirror glass 16. The space between the channels is preferably inclined so that the small mirror piece will be inclined toward the center of the frame. The channel bead 15 may also receive a large mirror piece 17 which is inclined outwardly and which has its outer edge within a channel opening 18 formed on the outer edge of the piece 10. Each of the pieces are similarly constructed with beads for receiving the mirror pieces. The bottom frame piece 13 has a separable flange or channel bead 19 which is finally fixed to the piece 13 as by nails 21 entering openings or holes 22. The mirror piece on this piece 13 is the last mirror to be assembled.

In the assembly of the frames, the side frame pieces are connected together with the small mirrors 16 disposed in each of the pieces between the channel beads 14 and 15. Thereafter when it is desired to more fully assemble the frame with the larger mirror pieces, the mirror piece for the top is inserted as illustrated in Figs. 4 and 5 through a slot 24 in a flange of the side piece 12. The side of the slot comprises a projection 25 which can be slightly lifted in order that the mirror piece 17 can be accommodated to the small slope on the front face of the piece 10. After the mirror piece 17 has been inserted, the projection 25 will return to its original position and the slot may be filled with putty as indicated at 26 in Fig. 3. Thereafter other large mirror pieces 17 and 18 are extended in endwise fashion upwardly from the bottom and into the opposite side pieces 11 and 12. Finally the bottom mirror piece is assembled upon the frame piece 13 and flange strip 19 is then fixed to the bottom piece 13 by the nails 21.

Accordingly all of the mirror pieces are held in channel openings of the beads and there is no necessity for the mirror pieces being glued at all upon the frame.

In the opening, as indicated at 28, there can be extended a glass 29 and a picture 31. The picture will be retained by pins 32 engaging with the rear face of the same.

While various changes may be made in the detail construction, it shall be understood that such changes shall be within the spirit and scope of the present invention as defined by the appended claims.

Having thus set forth and disclosed the nature of this invention, what is claimed is:

1. A picture frame comprising top, side and bottom frame pieces, said frame pieces having inner and outer beads with channels respectively to receive large mirror pieces and to retain the mirror pieces, said frame pieces being adapted to receive the mirror pieces after the frame pieces have been assembled, one of said frame pieces having a slot whereby a mirror piece can be extended through the slot in the frame piece and into a cooperating frame piece and in an endwise manner.

2. A picture frame as defined in claim 1 and another one of said frame pieces having a removable outer channel bead so as to permit the endwise insertion of mirror pieces on two frame pieces and the edgewise insertion of a mirror piece on the piece having the removable outer channel bead.

3. A picture frame as defined in claim 1 and a third bead associated with each frame piece and having channels on the opposite sides thereof, the said inner channel bead having a channel on the inner side of the same, and small mirror pieces assembled between the third channel bead and the inner channel bead whereby small mirror pieces can be assembled initially with the frame pieces.

MURRAY J. SCHNEIDER.

REFERENCES CITED

The following references are of record in the file of this patent:

UNITED STATES PATENTS

| Number | Name | Date |
|---|---|---|
| 903,955 | Carl et al. | Nov. 17, 1908 |
| 2,223,674 | Cohen | Dec. 3, 1940 |
| 2,388,180 | Pulver | Oct. 30, 1945 |